United States Patent
Pavlyuk et al.

(10) Patent No.: US 10,527,423 B1
(45) Date of Patent: Jan. 7, 2020

(54) FUSION OF VISION AND DEPTH SENSORS FOR NAVIGATION IN COMPLEX ENVIRONMENTS

(71) Applicant: Luftronix, Inc., Franklin Lakes, NJ (US)

(72) Inventors: Roman Pavlyuk, L'viv (UA); Volodymyr Kozak, L'viv (UA); Klaus Sonnenleiter, Franklin Lakes, NJ (US); Denise Spell, Ridgewood, NJ (US)

(73) Assignee: LUFTRONIX, INC., Franklin Lakes, NJ (US)

( * ) Notice: Subject to any disclaimer, the term of this patent is extended or adjusted under 35 U.S.C. 154(b) by 43 days.

(21) Appl. No.: 15/480,524

(22) Filed: Apr. 6, 2017

Related U.S. Application Data

(60) Provisional application No. 62/319,402, filed on Apr. 7, 2016.

(51) Int. Cl.

| | |
|---|---|
| *G01C 21/00* | (2006.01) |
| *G01C 21/16* | (2006.01) |
| *G01C 21/30* | (2006.01) |
| *G08G 1/0968* | (2006.01) |
| *G01C 21/34* | (2006.01) |
| *G05D 1/10* | (2006.01) |
| *G01C 11/06* | (2006.01) |
| *G01C 11/12* | (2006.01) |
| *G01S 17/89* | (2006.01) |

(Continued)

(52) U.S. Cl.
CPC .......... *G01C 21/005* (2013.01); *G01C 11/06* (2013.01); *G01C 11/12* (2013.01); *G01C 21/16* (2013.01); *G01C 21/30* (2013.01); *G01C 21/34* (2013.01); *G01S 13/89* (2013.01); *G01S 17/026* (2013.01); *G01S 17/42* (2013.01); *G01S 17/89* (2013.01); *G05D 1/101* (2013.01); *G06T 7/20* (2013.01); *G06T 7/579* (2017.01); *G06T 7/70* (2017.01); *G08G 1/0968* (2013.01); *H04N 3/09* (2013.01); *B64C 2201/12* (2013.01)

(58) Field of Classification Search
CPC combination set(s) only.
See application file for complete search history.

(56) References Cited

U.S. PATENT DOCUMENTS

| | | | |
|---|---|---|---|
| 8,761,990 B2 | 6/2014 | Chrysanthakopoulos et al. | |
| 9,830,411 B2 * | 11/2017 | Gnecco | ............ B64F 5/60 |

(Continued)

OTHER PUBLICATIONS

"Collaboration, expertise produce enhanced sensing in Xbox One", Microsoft Technet @ https://blogs.technet.microsoft.com/microsoft_blog/2013/10/02/collaboration-expertise-produce-enhanced-sensing-in-xbox-one/ dated Oct. 2, 2013, accessed Aug. 30, 2018.

*Primary Examiner* — Adam D Tissot
*Assistant Examiner* — Edward J Pipala
(74) *Attorney, Agent, or Firm* — Michael J. Feigin, Esq.; Feigin and Fridman

(57) ABSTRACT

A system and a method for autonomous localization of a ground, surface or aerial vehicle with respect to a surface of a complex shape is disclosed. Localization is used by way of an optical flow method. Sensed optical (electro-optical, infrared, thermal) images are augmented by depth data, i.e., distance from the distance sensor to points on the sensed surface object. A modification of the optical flow method is applied to sequence of frames obtained in such a way to compute displacement of the vehicle with respect to the surface object.

20 Claims, 6 Drawing Sheets

(51) Int. Cl.
*G01S 13/89* (2006.01)
*G01S 17/02* (2006.01)
*G01S 17/42* (2006.01)
*G06T 7/579* (2017.01)
*G06T 7/20* (2017.01)
*G06T 7/70* (2017.01)
*H04N 3/09* (2006.01)

(56) References Cited

U.S. PATENT DOCUMENTS

2013/0329012 A1 12/2013 Bartos et al.
2015/0229906 A1 8/2015 Inacio De Matos et al.

\* cited by examiner

FUSION OF VISION AND DEPTH SENSORS FOR NAVIGATION IN COMPLEX ENVIRONMENTS

FIELD OF THE DISCLOSED TECHNOLOGY

This invention is related to the field of localization in robotics, and particularly to autonomous localization.

BACKGROUND OF THE DISCLOSURE

Navigation typically works by way of optical flow. One sees an object in their field of vision and sees how the object is moved. This has been brought to the mainstream in game controller systems which transmit optical pulses and measure distance to objects based on detection of the optical pulses. One can move their hands to control an on-screen object, or when used in the reverse, one can move the detector to change the view shown to the user depending on his or her position.

While such systems of optical flow work, they have a drift (accumulated error) of up to about 5%, meaning that if your object is moving a distance of 100 meters from start to finish, the determined finishing point might be five meters in error. When using a drone (defined as "an autonomous flying device" or "a device capable of autonomous flight"), such an error is typically very problematic. It may work in a wide open space, but while trying to, for example, examine a particular object at close range or move through an office building or along a complex shape (e.g. windmill), such inaccuracy is intolerable.

What is needed is a way to be able to enable autonomous navigation with less drift and higher accuracy.

SUMMARY OF EMBODIMENTS OF THE DISCLOSED TECHNOLOGY

A close-range drone navigation system of embodiments of the disclosed technology guides a drone over a navigation path or flight path. "Close-range" is defined as having a flight path which, while embodiments of the disclosed technology are operational, is within 14 meters of other objects. While the disclosed technology can be used in conjunction with other navigational systems, including those with altimeters, gyroscopes, and cameras, the close-range technology is designed for navigation around objects which are between 0.5 or 1 cm and 14 m. At the time of writing, the present accuracy of the technology is to 0.5 centimeters of precision, however, it should be understood that it is within the scope of the equivalents of the disclosed technology to use same with more accurate positioning than 0.5 cm as, for example, processor speed and optics improve in the technology used.

The drone body (a casing or housing which holds or is the drone) has a flying mechanism (a device operational to move the drone through three-dimensional space in the X, Y, and Z directions) is attached to (including held within) the drone body. A directional energy source (such as visible light, infrared light, sound waves, and/or sonar) is pointed in at least a first direction. A distance measuring device determines a distance to a closest object in the first direction based on a received reflection of the directional energy. For example, a measurement of the time taken for the light or sound to reach an object and be reflected back to the drone or received on the drone is used to determine the distance of an object or objects. Such a method can be used to measure distance of objects all around the drone.

A camera is also pointed in the first direction, receiving visible light. The camera can be color or black and white and have one of a variety of resolutions. In some embodiments, 320 by 240 pixels is used to allow for very high frame rates (60 fps (frames per second), 100 fps, or 150 fps are all possible). A contrast determination system determines a plurality of points of contrast within images generated in a plurality of frames from output of the camera. Those with highest contrast are tracked from frame-to-frame as such points of high contrast move across the frame due to movement of the drone. A position determination system determines a location of the drone based on a combination of movement of each point of contrast of the plurality of points of contrast from a one frame to at least one additional frame in the plurality of frames and distance to an object represented by each point of contrast from the first frame to the second frame as determined by the distance-measuring device.

In some embodiments, some frames are ignored. This is where at least one point of contrast of the plurality of points of contrast is missing or changed above a pre-defined threshold of contrast, but then "re-appears" again in later frames at a same or slightly different position (again, within a threshold which can be determined based on where the point of contrast is expected in the frame due to its change in distance and velocity of the drone from frame to frame). This ignored frame is ignored for purposes of determining the location of the drone while a frame before the ignored frame and a frame after the ignored frame of the plurality of frames is used to determine the location of said drone. The "ignored frame" can be a plurality of ignored frames, and can be due to an object moving faster than the drone body but slower than the frame rate.

Points which remain at a constant contrast to surrounding points, within a pre-determined threshold, through at least a minimum pre-determined threshold for number of frames while said drone is moving are the points of contrast which are used to determine the location of the drone. The location of the drone can be relative to a starting point of measuring the location, and/or are relative to a fixed coordinate system. A gyroscope and/or altimeter can also be used to aid in determining position of the drone.

The exposure used by the camera can change over the course of the navigation. In addition, multiple exposures can be used simultaneously, one exposure making some points of contrast visible while another exposure making another point of contrast visible to determine said location of said drone.

The flying mechanism causes the drone to engage in flight, at least partially, along a pre-determined flight path with at least an ending location for the flight, but the flight path is adjusted to avoid collision with at least one closest object. After passing the object, the drone, in embodiments, returns to the flight path. While doing so, a minimum distance can be pre-set such that the drone keeps at least this minimum distance from all objects. Such a distance can be 1 cm, 5 cm, 10 cm, or 100 cm due to the high accuracy of the method which is accurate to 0.5 cm in some embodiments. This is true even though in some embodiments, the drone and systems there-within have no knowledge of contrast or object positions prior to flying along the flight path (with exceptions 100 for collision avoidance).

Said another way, a drone is configured to travel over a flight path from a starting location to an ending location, while configured to carry out the following: Visual images of surroundings of the drone are received using a camera, receiving the images in the form of multiple frames. A "frame" for 105 purposes of this disclosure is a still image within a plurality of images taken in a sequence over time. In each such frame, points of greatest contrast are determined. This can be two points, three points, six points, ten points, twenty points, or thirty points. Their contrast and position within the frame is determined and they are tracked by contrast (and/or color) through the 110 multiple frames. "Contrast" for purposes of this disclosure is defined as "a difference in intensity of light compared to surroundings." Thus, a "contrast point" is a "pixel or group of adjacent pixels which are delineated by a change in contrast around the pixels or group thereof." At the same time, as contrasting points are being determined or are determined, directional energy (light, radio, etc.) is emitting at, at least, the points of contrast if not the majority or substantially the entirety of objects within each frame/field of view of the camera. Distances to each object/each point of highest contrast is determined based on a received response or detection of the directional energy. In this manner, the position of the drone, relative to other objects, is made while the drone flies or otherwise travels.

At least some positions of a flight path can be received by the drone into memory stored on the drone (volatile or non-volatile) as the drone can move along this flight path to each position, excepting for adjustments made to the flight path to avoid collision with the objects detected. The points of greatest contrast change over the flight path in some cases. Some of said points of greatest contrast drop out of view of the camera (due to be out of the field of vision or due to having reduced contrast) while other new points of greatest contrast enter a view of the camera. "Field of vision" is defined as "places where light enters the camera lens". The drone maintains the flight path as long as at least one point, two points, or three points of greatest contrast is detected throughout the flight, even if this point, whichever one it is, of greatest contrast, changes to be a different point/object over time. Likewise, by knowing the location relative to a starting point, an object which disappeared can be re-detected (again detected) based on a determination that a new contrast point is emanating from a location of a previously detected contrast point. This can occur for a long period of time (defined as out of view for 10 seconds or more) or a short period of time (defined as 1 second or at less-than-60 times the frame rate). A frame which is missing points of contrast which were previously being tracked can be ignored entirely (such as when another object briefly passes there-between the object whose light is generating the point of contrast, and the drone).

In embodiments of the disclosed technology, the points of greatest contrast are calibrated relative to a first frame received from the camera at a first position along the flight path. That is, the drone has no prior "knowledge" of its surroundings. The drone may be given a flight path or simply given instructions to fly while employing the disclosed technology to avoid object collision while its position is otherwise controlled by remote control or a pre-defined flight path or ending position.

Multiple exposure levels are used throughout at least part of the travel, in embodiments of the disclosed technology. Upon non-detection of a previously tracked point of greatest contrast (taken from all of the points of greatest contrast) a second exposure level of the multiple exposures can be used to track the previously tracked point of greatest contrast. Upon detection of a new point of greatest contrast using the second exposure level, the new point of greatest contrast is tracked over the (remaining) multiple frames.

Drone, for purposes of this disclosure, is defined as "a robotic or mechanical device with an energy source and energy output causing its movement in one and/or both of an X, Y, and Z direction".

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

Figure 1:
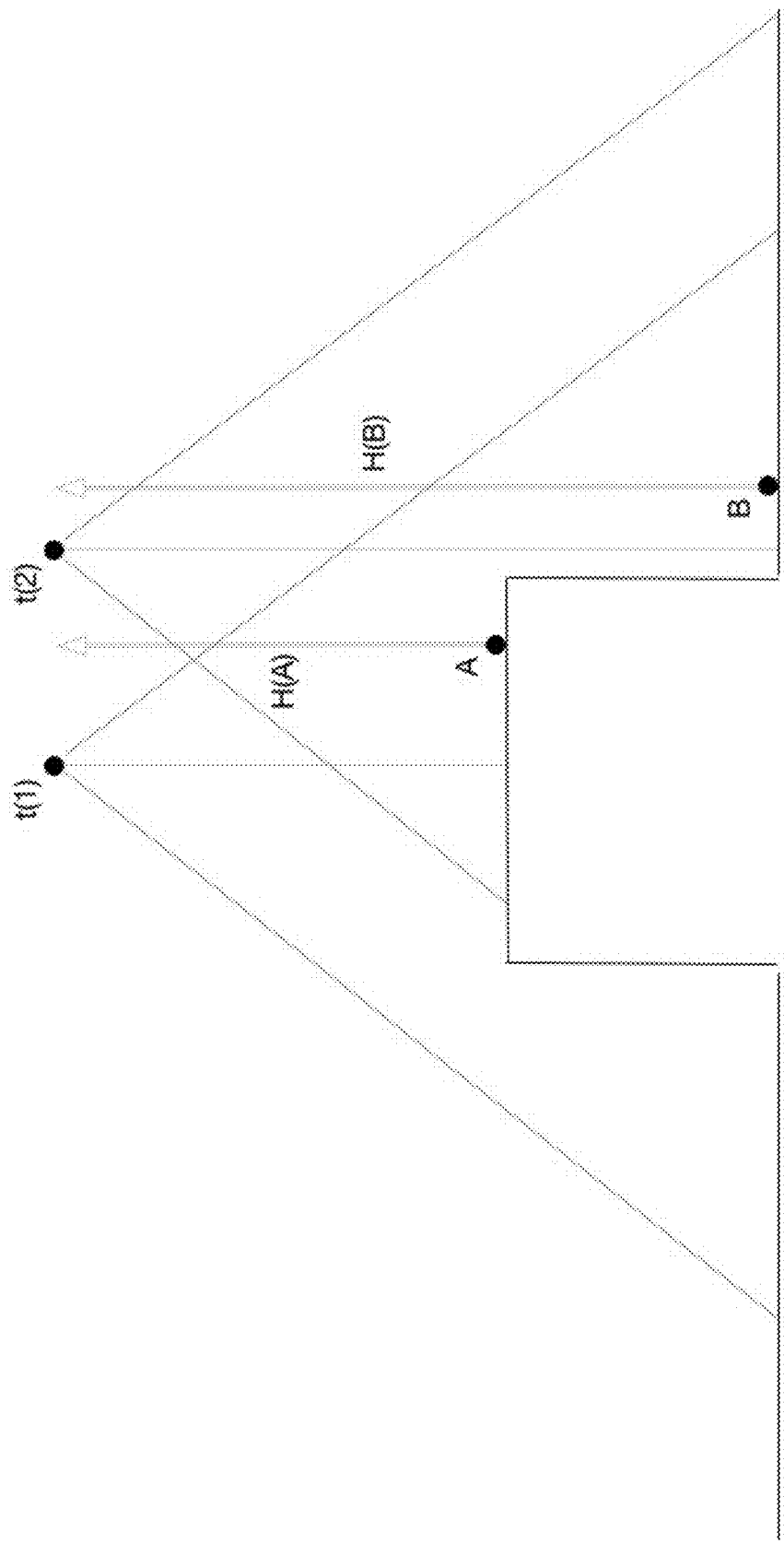
FIG. 1 depicts a moving vehicle with a downward-looking synchronized optical and depth camera, capturing images of a complex surface at time moments $t_1$ and $t_2$ where $t_2 > t_1$.

The disclosed technology uses an apparatus, which provides pixel level-synchronized images from an optical and depth camera, so that accurate distance to each distinctive point is known, resulting in a modified optical flow method, as will be explained.

Autonomous localization of embodiments of the disclosed technology uses cameras and laser-distance sensors to determine the location of objects around a vehicle. A flight or travel path of the vehicle is made and modified based on the locations of such other objects. In some embodiments, this method is used for any one- or plurality-of determining the position and orientation of the vehicle itself, autonomous landing of delivery drones, emergency navigation and landing in case of GPS signal loss (GPS is a global positioning system, or for purposes of this disclosure, any satellite-based navigation system) such as during flight at low altitudes in urban canyons, and other similar GPS-impaired environments. Further applications include industrial structure inspection, underground structure inspection where it's necessary to fly in close proximity to structures, especially in indoor environments.

The methods of carrying out the disclosed technology proceed as follows. A vehicle position in two or three axes of what will be called an "external coordinate plane" is received. This external coordinate plane can include a precise latitude and longitude and/or altitude, and distance in each axis from a designated starting point, or the like. Such a position in the external coordinate plane can be reported by a position-indication device on the vehicle which transmits same wirelessly (e.g. by radio frequency) or via an electric cable to another device on-board the vehicle, such as memory or a processor. A processor is "a hardware device which carries out instructions received" and memory is "volatile or non-volatile storage in a physical medium using electric or mechanical storage".

An "internal coordinate plane" is also defined based on the relative position of the vehicle and its constituent parts. This includes a position of the camera, and more specifically, the focal point or other area of the lens, mounted on the vehicle is further known relative to the position of the position-indication device. To translate motion of the vehicle from pixel distance, camera parameters are acquired including any one- or combination-of focal distance, pixel and sensor dimensions, as well as the distance from the camera to the distinctive points.

The camera captures an image digitally, and a resulting digital image is created and stored in memory. The digital image is broken down into pixels. A distance of each pixel is then determined in order to create a three-dimensional model of the objects near the vehicle in the external coordinate plane. The camera is actually, in embodiments of the disclosed technology, made up of a plurality of individual lenses with individual focal points including at least one optical camera and one depth camera capturing data at the same time. A "depth camera" provides depth information, as is known in the prior art, by using an RGB camera with depth sensor and infrared projector with a monochrome CMOS sensor which sees the environment not as a flat image, but as dots arranged in a 3D environment. A constant, predetermined pattern of infrared dots is made in the frame of the digital image and the CMOS sensor is placed at an offset relative to the transmitter. The difference between the observed and expected dot positions is used to calculate the depth at each pixel of the RGB camera.

Before delving into a detailed description, at a high level, more accurate determination of the position of the objects is then made by carrying out the following steps:

In a first step, pixels which remain at a same coordinate position on the afore-described and defined external coordinate plane (despite movement of the vehicle) over a pre-defined period of time are considered "stable". That is, an object is considered to have an edge at the coordinate position of the pixel which has remained in the same absolute coordinate space while the vehicle moves or stays stationary. The position, or change of position of the vehicle thus has no effect on this determination because the determination is of the position of the object, determined using the depth camera, processor, and so forth described previously.

In the second step, only those points, for which the distance is known, are taken into consideration.

In the third step, points of interest are projected onto a plane parallel to the focal plane of the optical camera.

In the final step, translation of the center of mass of the points of interest, based on this the distance traveled by the vehicle is computed.

The optical method relates displacement of distinctive points on consecutive images with motion of the vehicle.

Embodiments of the disclosed technology will become more clear in view of the following description of the Figure:

FIG. 1 depicts a moving vehicle with a downward-looking synchronized optical and depth camera, as described above, capturing images of a complex surface at time moments $t_1$ and $t_2$ where $t_2 > t_1$. Two distinctive points A and B are tracked by the method described above. The distance from the camera's focal plane to the points are $h_A$ and $h_B$ respectively.

In the embodiment shown in the figure, the vehicle moves in the direction along axis X, oriented from the left to the right in the plane of the figure. (It should be understood that the same method applies with movement along two or three axes but one is being described for purposes of easier understanding.)

Based on the measurement of time and movement described above, the following is then carried out to determine the drone position in three-dimensional space of objects.

The camera has an internal coordinate system as described above. Within this internal coordinate system, the camera's focal distance is referred to herein as f. The camera is at the center of mass of points A and B with projections made onto the focal plane of the points. Global system center is at the center of mass of points A and B projection onto the plane containing point B at the moment $t_0$.

A coordinate of the distinctive point A in the internal coordinate system is $x_A$, but in the external coordinate system is $X_A$.

From triangle similarity $x_i/f = X_i/h_i$, implying that $X_i = x_i h_i / f$.

With such choice of coordinate systems, global coordinate of a vehicle at time $t_1$ is 0, and at time $t_2$ is the new coordinate if the center of mass of distinctive points, $X = (X_A + X_B)/2$. Thus, the size of the displacement vector is used to calculate the displacement of the vehicle. By using the size of displacement for multiple points and then dividing by the number of points, a correct number is arrived at for the vehicle. In reality, the displacement is measured in a multi-dimensional vector. For simplicity, it is described here as a vector with a dimension of 1—but the outcome is the same with larger vectors. A displacement vector of size 1 shows movement on a single axis. In most embodiments, movement is along three axes and displacement is shown for each of the three axes.

In the prior art, average distance to point plane, $h = (h_A + h_B)/2$, is the best achievable precision. Traditional methods thus bear inherent localization error $e = |X - X_{traditional}| = \frac{1}{2} * (x_A h_A + x_B h_B - (x_A + x_B)*(h_A + h_B)/2)/f = \frac{1}{4} * 1/f * |h_A - h_B| * (x_A + x_B)$.

The error of the traditional method is proportional to the difference between the maximum and minimum distance from the reference surface and the plane parallel to the focal plane.

The present technology eliminates this error component, limiting it only to the error of distance measurement.

Figure 2:
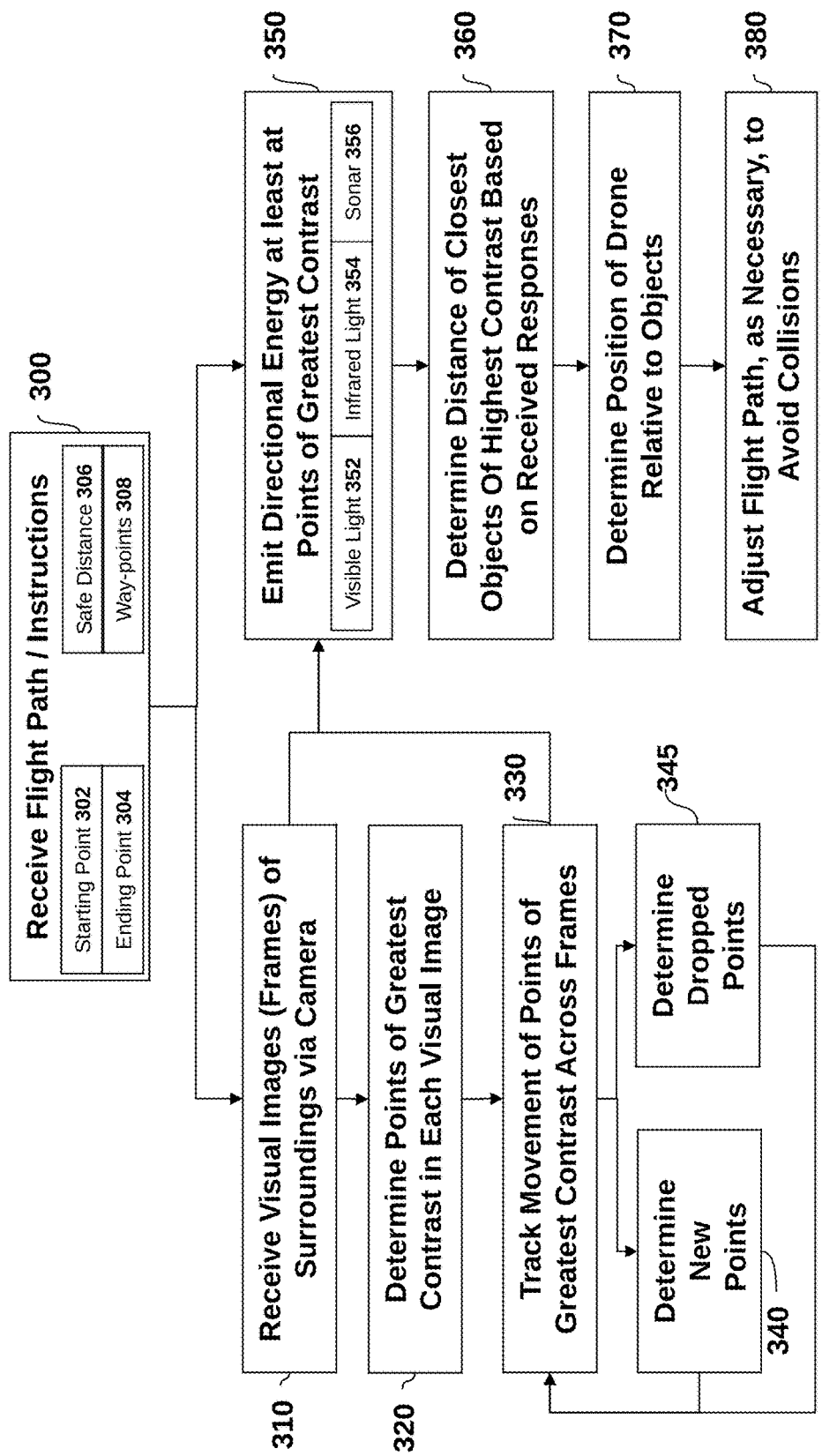
FIG. 2 is a flow chart of steps used to carry out embodiments of the disclosed technology.

FIG. 2 is a flow chart of steps used to carry out embodiments of the disclosed technology. In step 300, the flight path or flight instructions are received by the drone. This can include any one of, or a plurality of, a starting point 302 where the flight begins, an ending point 304 where the flight ends, way points 308 where the drone stops along the flight path, and a safe distance 306 which is the amount of distance the drone is to keep from other objects during its flight. In some embodiments, the starting point 302 is unknown to the drone and components thereof. The starting point is simply the point where the drone begins its journey and it may receive no input regarding its location and be simply instructed to scan an area of a certain distance from its starting point, scan an object in its view having certain characteristics (having a certain shape and/or color). Such objects can include planes, windmills, buildings (interior rooms or exterior sides or both), vehicles (e.g. traffic) and so forth.

Step 310 is then carried out whereby visual images of the surroundings are received via camera. They are received in the form of multiple still pictures which are referred to herein as frames. In embodiments of the disclosed technology, this is carried out at a high frame rate such as 50 fps, 100 fps, 150 fps, or 200 fps. As such, minute differences between frames can be detected and precise movement can be determined to a half-a-centimeter level of accuracy or better. In order to do this, the resolution of each frame can be kept low, such as at 320 by 240 resolution. Other resolutions such as 640×480, 800×600, and so forth are also used in embodiments of the disclosed technology. Depending on the accuracy, in step 320, the resolution can be varied during the flight path or two simultaneous resolutions can be used, at least, over part of the flight. This will become more clear with the discussion of step 320 which follows.

Figure 5:
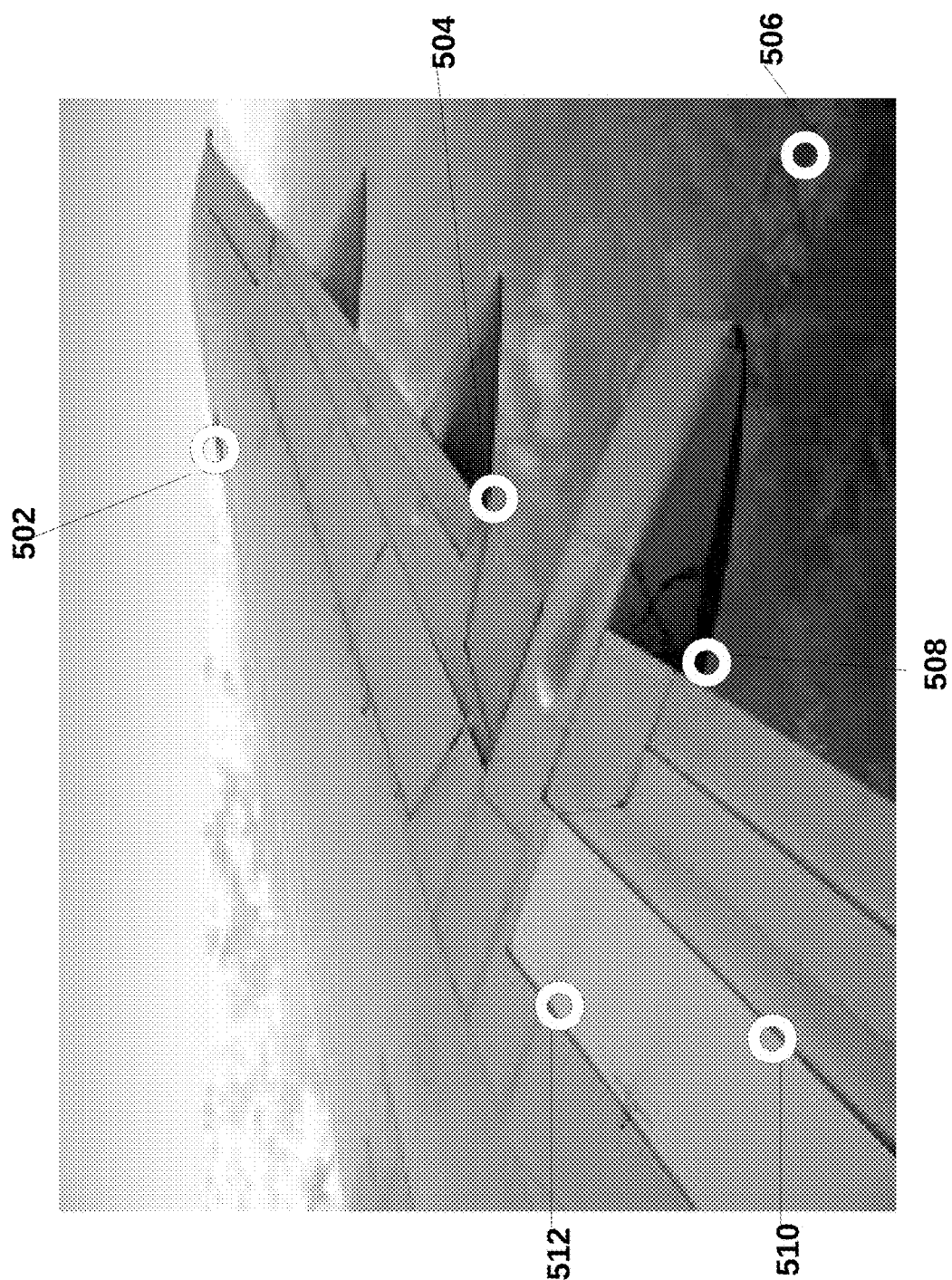
FIG. 5 shows an example of a frame/image received by a camera in an embodiment of the disclosed technology.

In step 320, points of greatest contrast in each visual image are determined. These are points which have a level of contrast (bright or dark) which are most different than other surrounding points. An example is shown in FIG. 5. These points can be a single pixel or a combination of adjacent pixels with a similar level of contrast. In some embodiments, black and white is used due to the higher levels of contrast. In other embodiments, color is used and can also be matched. When receiving input at high-frame rates, from one frame to the next, the contrast usually changes only slightly so the highest points of contrast in each frame (such as the 16 highest points) generally move only slightly (defined as "less than 1%. 2%, or 3%" in an X or Y direction, or combination thereof, across a frame) and can be tracked, in step 330. However, as drone progresses in its travels from a starting point 302 to an ending point 304, some points will drop out (step 345) due to reaching an edge of a frame and then falling out. This is detected and such points of high contrast are then dropped while new points are determined in step 340. The new points are determined based on, at each new frame, finding the highest points of contrast and detecting where a new highest point of contrast (such as one of the 16 highest points of contrast) enters the frame. Further, a higher point of contrast may enter the frame even as no other points of contrast leave the frame. Or, what was a highest point of contrast may have less contrast than another in a further frame and no longer be one of the highest points of contrast.

In each of these cases, the system can then track the additional points of contrast or choose the highest points of contrast, such as the top 12, 16, or 24 points of contrast. As long as points of contrast are constantly tracked in step 330, the navigation and location determination of the drone remains uninterrupted. At minimum, there must be 1, 2, or 3 points of contrast which are being tracked depending the allowable margin of error. More points of contrast mean less error, but more processing power as all of this must take place in real-time. Real-time, for purposes of this disclosure, is defined as "a method of location determination which is processed at least as fast as to allow uninterrupted flight of the drone based on flight relative to the drone's prior known location or locations."

Still further, discussing steps 310-345 in general, the visual images are received from a first direction, such as in a direction of movement of the drone, but can also be received from the sides (left and right), as well as above and below simultaneously. One of these views, or a combination of them, can be chosen based on which produces the most valuable points of contrast (those which have the most contrast and those which remain over the course of the most frames).

Now discussing the right side of FIG. 2, steps 350 through 380 discuss distance measurements and determination of location. This is in combination with determining the points of contrast. In short, by having both the relative position of each point of contrast, and fusing this with a known distance of each point of contrast, one can determine the location of the drone very precisely.

In step 350, directional energy is emitted toward the points of greatest contrast. This can be visible light 352 such as laser light, infrared light 364, or sound waves such as sonar 356. The directional energy can be, in embodiments, against all points or regular intervals within a frame or just the points of interest (those with the greatest contrast). By measuring the time between sending out a pulse of light or sonar and receiving the response (step 360), one can determine the distance, as in step 370. FIG. 1 describes the method behind this in more detail, in order to calculate a relative position of the drone to other objects based on the distance to each object represented by a point of contrast. In step 380, the flight path can be adjusted as necessary to avoid collisions or maintain at least a minimum distance from objects.

Figure 3:
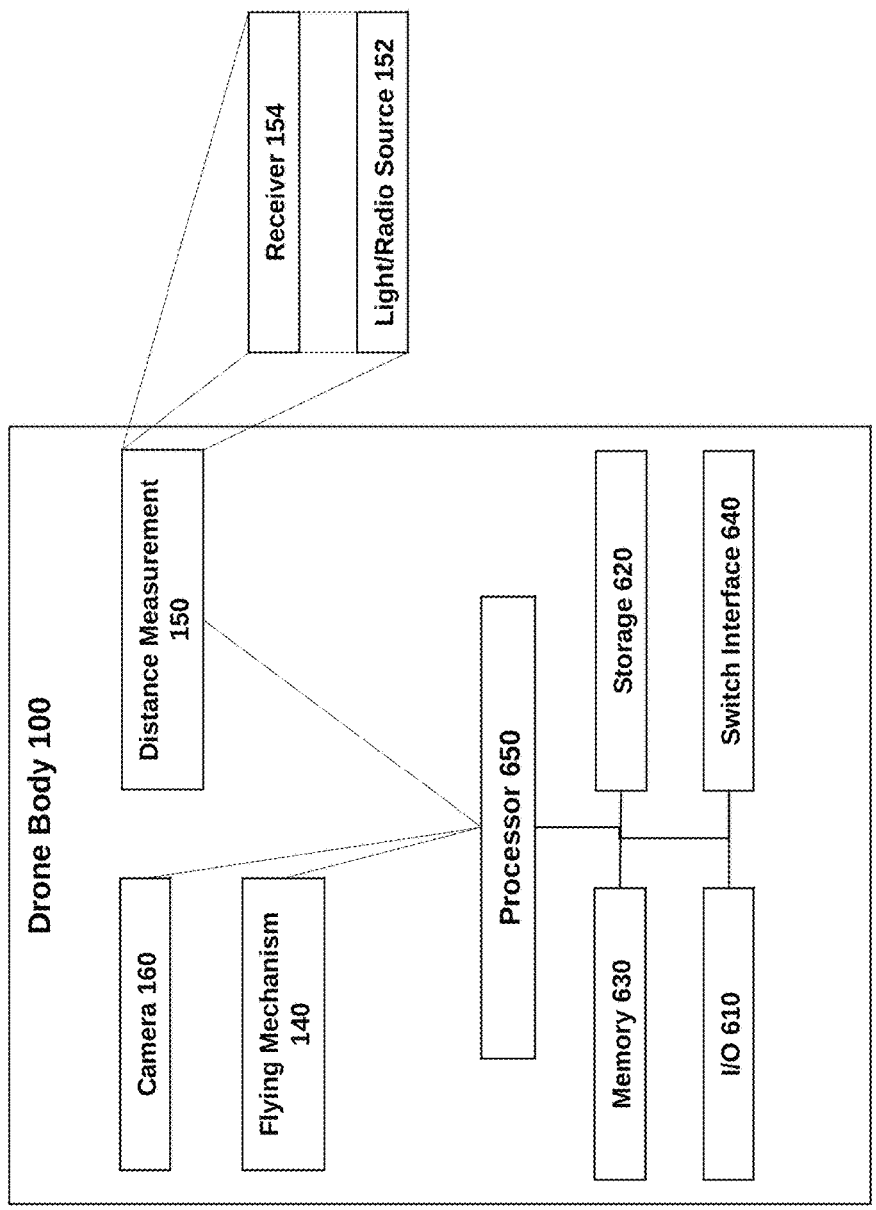
FIG. 3 shows devices used to carry out embodiments of the disclosed technology.

FIG. 3 shows devices used to carry out embodiments of the disclosed technology. A drone has a body 100 which is an outer shell of a flying or otherwise moving craft. A camera 160 is used to take visible light or infrared pictures or frames of the surroundings. A flying mechanism 140, such as propeller, jet engine, blades, or other devices are used to cause the drone to move or fly from place to place. A distance measurement tool 160 is used to measure the distance from the drone to objects, such as those which produce the greatest contrast in an image received by the camera 160. The distance measurement 150, in embodiments of the disclosed technology, has a light or radio source 152 which is emitted towards an object, and a receiver 154 for receiving back the light or radio as a received response after the light or radio source is reflected off the object. The elements 610 through 650 interact with the inputs received from the elements 140-160, or are used such that the processor 650 sends instructions to the other devices. The elements 610-650 are described in more detail in FIG. 4 below.

Figure 4:
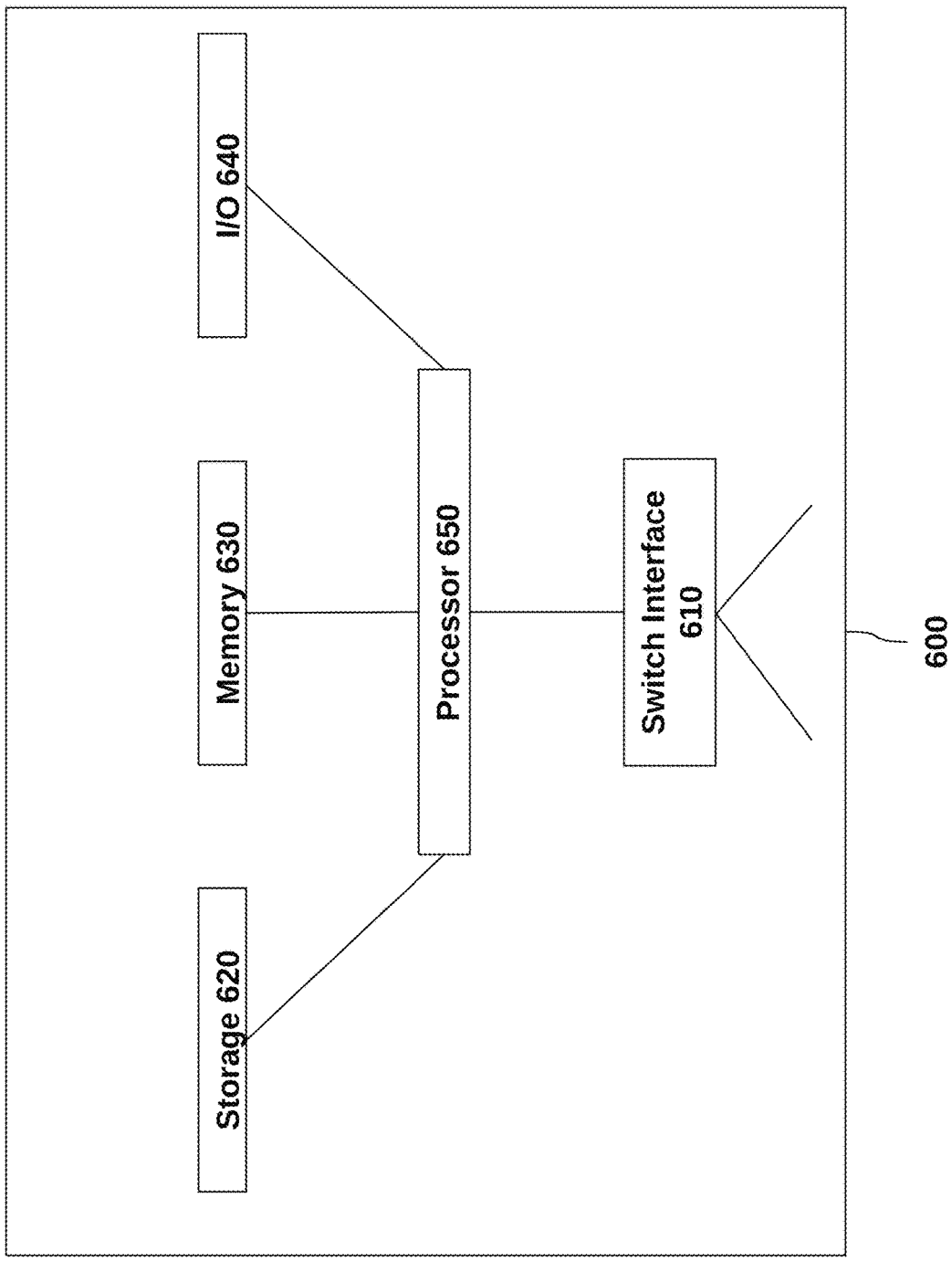
FIG. 4 shows a high-level block diagram of a device that may be used to carry out the disclosed technology.

FIG. 4 shows a high-level block diagram of a device that may be used to carry out the disclosed technology. Device 600 comprises of a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 4 is a high-level representation of some of the components of such a device, for illustrative purposes. It should also be understood by one skilled in the art that the method and devices depicted in FIGS. 1 through 3 may be implemented on a device such as is shown in FIG. 4.

FIG. 5 shows an example of a frame/image received by a camera in an embodiment of the disclosed technology. In such a case, the drone may be instructed to inspect an entirety of a plan, including a wing with a known shape. In this low-resolution camera image at high contrast, various points of highest contrast 502, 504, 506, 508, 510, and 512 are detected. These points are then tracked from frame to frame. That is, as the drone moves, these points will move as well. Multiple exposures can be taken at once, such that the one which brings out the most points of contrast can be used. Further, as the drone travels, it may be found that a different exposure brings out the most points of greatest contrast or points which have greater contrast than previously seen. As such, the different second exposure can be used for carrying out the steps described with reference to claim 3. This different second exposure can be for some of the frames, and then based on the exposure that brings out the most points of contrast or most contrast, the exposure used can again change. Or multiple exposures can be used throughout a plurality of frames. This is useful when the light dramatically changes (e.g. flying under a wing which blocks a direct light source) and during the transition, one exposure is used for one part of the image and another for a second part of the image.

Still referring to FIG. 5, as the drone moves, the image will shift (not shown) and various points will move more than others. Assuming the drone is flying, for purposes of this example, straight into the plane defined by the paper or screen where FIG. 5 is viewed, then contrast point 510 will move "downward" from frame-to-frame the most while contrast point 506 which is far away will move very little. Further, contrast point 506 is probably more than the maximum of 14 meters from the drone, so a response will not be received from the light or sound emitting there-towards and this point will be ignored. When, as the drone continues to move, contrast point 510 is out of view entirely, it will be dropped from the contrast points used, but the location of the drone relative to the contrast point will still be known based on the calculations of location of the drone relative to each contrast point from the starting point forward.

Figure 6:
FIG. 6 shows an example of a frame/image received by a camera in an embodiment of the disclosed technology with unreliable contrast points

FIG. 6 shows an example of a frame/image received by a camera in an embodiment of the disclosed technology with unreliable contrast points. This image is the same as that shown in FIG. 5, except a bird 550 is shown blocking two of the points of highest contrast. As such, new points of highest contrast would actually be determined here given that the black bird have a great amount of contrast with the gray plane wing behind same. However, the speed of movement of the contrast points generated by the bird 550 will be much greater than the surroundings and only last below a threshold of time, which can be a pre-programmed threshold of time that a contrast point has to appear before it can be used, or can be determined automatically based on being out-of-bounds compared to the rest of the contrast points. Further, the distance measured at/for the contrast points generated by the bird 550 or another blocking object will be very different than those of the others previously measured at the particular location in the frame, and this can also be used to discount such "invalid" contrast points. This has been tested, in fact, with sending a drone to scan a windmill with spinning blades and the movement of the blades between the drone and windmill was discounted, allowing the drone to continue to navigate properly around the structure.

Further, it should be understood that all subject matter disclosed herein is directed and should be read only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

The invention claimed is:

1. A close range autonomous flying device navigation system, comprising:
   an autonomous flying device body;
   a flying mechanism attached to said autonomous flying device body, adapted to cause said autonomous flying device to move in three dimensions;
   a directional-energy source pointed in at least a first direction;
   a distance-measuring device which determines a distance to a closest object in said first direction based on a received reflection of said directional energy;
   a camera pointed in said first direction;
   a contrast determination system which determines a plurality of points of contrast within images generated in a plurality of frames from output of said camera; and
   a position determination system which determines a location of said autonomous flying device in three dimensions based on a combination of:
   a) movement of each point of contrast of said plurality of points of contrast from one frame to at least one additional frame in said plurality of frames; and
   b) distance to an object represented by each said point of contrast from said first frame to said at least one additional frame as determined by said distance measuring device.

2. The close-range autonomous flying device navigation system of claim 1, wherein said directional energy source is selected from the group consisting of sonar, visible light, and infrared light.

3. The close-range autonomous flying device navigation system of claim 1, wherein said plurality of frames are measured at a frame rate of at least 60 frames per second and said location of said autonomous flying device is determined in real-time.

4. The close-range autonomous flying device navigation system of claim 3, wherein said frame rate is at least 100 frames per second and said location of said autonomous flying device is determined in real-time relative to a starting point of measuring said distance.

5. The close-range autonomous flying device navigation system of claim 3, wherein at least one ignored frame is between said one frame and said at least one additional frame where at least one point of contrast of said plurality of points of contrast is missing or changed above a pre-defined threshold and said at least one ignored frame is ignored for purposes of determining said location of said autonomous flying device while a frame before said ignored frame and a frame after said ignored frame of said plurality of frames is used to determine said location of said autonomous flying device.

6. The close-range autonomous flying device navigation system of claim 5, wherein said at least one said ignored frame is due to an object moving faster than said autonomous flying device body but slower than said frame rate.

7. The close-range autonomous flying device navigation system of claim 1, wherein points which remain at a constant contrast to surrounding points, within a pre-determined threshold, through at least a minimum pre-determined threshold number of frames of said plurality of frames while said autonomous flying device is moving are said plurality of points of contrast used to determine said location of said autonomous flying device.

8. The close-range autonomous flying device navigation system of claim 7, wherein said method is carried out at a first exposure of each said plurality of frames; and
said method of claim 7 is carried out for new said points of contrast at a second exposure;
wherein said new points of contrast are above a threshold of contrast from surrounding points at said second exposure and are below said threshold of contrast at said first exposure.

9. The close-range autonomous flying device navigation system of claim 1, further comprising a gyroscope which is used in said position determination system to determine a three dimensional orientation of said autonomous flying device at said location.

10. The close-range autonomous flying device navigation system of claim 1, wherein said flying mechanism causes said autonomous flying device to engage in flight, at least partially, along a pre-determined flight path with at least an ending location for said flight, said pre-determined flight path adjusted in three dimensions to avoid collision with at least one said closest object.

11. The close-range autonomous flying device navigation system of claim 10, wherein a location of said autonomous flying device, relative to its starting position, is accurate to less than one centimeter throughout said flight due to detection of movement of each said point of contrast, wherein at least one point of contrast is in only some of said plurality of frames.

12. The close-range autonomous flying device navigation system of claim 11, wherein information about objects around said autonomous flying device is unknown to said contrast determination system before receiving said output from said camera.

13. An autonomous flying device, configured to travel over a flight path from a starting location to an ending location, said autonomous flying device configured to carry out the following steps:
receive visual images of surroundings of said autonomous flying device using a camera in the form of multiple frames;
determine, in each frame of said multiple frames, points of greatest contrast;
track movement of said points of greatest contrast across at least some of said multiple frames;
emit directional energy at each of said points of greatest contrast in a field of view of said camera and determine distance of objects from said autonomous flying device based on a received response or detection of said directional energy;
determine a position of said autonomous flying device in three dimensions, based on movement of said points of greatest contrast across said at least some of said multiple frames and said distance of said objects, wherein each object of said objects is correlated to a point of great contrast of said points of greatest contrast.

14. The autonomous flying device of claim 13, further configured to receive at least some positions of a flight path into memory stored on said autonomous flying device and move along said flight path to each position, excepting for adjustments made to said flight path to avoid collision with said objects, at least some of said adjustments being height adjustments.

15. The autonomous flying device of claim 13, wherein said points of greatest contrast change over said flight path such that some of said points of greatest contrast drop out of view of said camera while other new points of greatest contrast enter a view of said camera; and
said autonomous flying device maintains said flight path as long as at least one point of greatest contrast is detected and distance to an object represented by said at least one point of greatest contrast is determined throughout said travel.

16. The autonomous flying device of claim 13, wherein said multiple frames include second frames wherein at least some of said determined points of greatest contrast are missing, and said second frames and at least one measurement of said distance of at least one object of said objects determined at a time associated with said second frames are ignored as long as said second frames last less than pre-determined threshold of time.

17. The autonomous flying device of claim 16, wherein said second frames lasts less than or equal to sixty times the frame rate.

18. The autonomous flying device of claim 16, wherein said points of greatest contrast are calibrated relative to a first frame received from said camera at a first position along said flight path.

19. The autonomous flying device of claim 18, wherein multiple exposure levels are used throughout at least part of said travel and upon non-detection of a previously said tracked point of greatest contrast of said points of greatest contrast a second exposure level of said multiple exposures is used to track said previously tracked point of greatest contrast.

20. The autonomous flying device of claim 19, wherein upon detection of a new point of greatest contrast using said second-exposure level, said new point of greatest contrast is tracked over at least some of remaining said multiple frames.

* * * * *